US 8,356,934 B2

(12) United States Patent
Howard

(10) Patent No.: US 8,356,934 B2
(45) Date of Patent: Jan. 22, 2013

(54) SURROGATE TEMPERATURE SENSOR FOR A RADIANT HEAT SOURCE

(76) Inventor: Paul Allen Howard, Reston, VA (US)

( * ) Notice: Subject to any disclaimer, the term of this patent is extended or adjusted under 35 U.S.C. 154(b) by 112 days.

(21) Appl. No.: 13/020,662

(22) Filed: Feb. 3, 2011

(65) Prior Publication Data

US 2012/0033708 A1 Feb. 9, 2012

Related U.S. Application Data

(60) Provisional application No. 61/371,480, filed on Aug. 6, 2010.

(51) Int. Cl.
G01K 1/12 (2006.01)

(52) U.S. Cl. ............ 374/133; 374/141; 374/1; 374/129; 374/44; 374/208

(58) Field of Classification Search .................. 374/1, 4, 374/5, 29, 31, 32, 39, 100, 141, 120–122, 374/129, 208, 43–45; 324/500, 501, 527, 324/750.1, 756.01, 96; 219/627, 632, 678, 219/200, 201; 73/116.01, 865.6, 865.9, 865.8, 73/866.5
See application file for complete search history.

(56) References Cited

U.S. PATENT DOCUMENTS

| | | | |
|---|---|---|---|
| 4,420,965 A * | 12/1983 | Farkas et al. ............ 374/43 |
| 4,516,543 A | 5/1985 | Abe |
| 5,541,475 A | 7/1996 | Wood |
| 5,838,114 A | 11/1998 | Penzenstadler |
| 6,310,323 B1 * | 10/2001 | Mahawili et al. ............ 219/390 |
| 6,585,408 B2 * | 7/2003 | El-Gabry et al. ............ 374/43 |
| 6,690,112 B2 | 2/2004 | Wood |
| 6,726,401 B1 | 4/2004 | Potts |
| 6,831,419 B1 | 12/2004 | Schmitkons |
| 6,933,683 B2 | 8/2005 | Borsuk |
| 2005/0018748 A1 * | 1/2005 | Ringermacher et al. ...... 374/121 |
| 2005/0115498 A1 | 6/2005 | Ingram |
| 2008/0017637 A1 | 1/2008 | Bretmersky |

FOREIGN PATENT DOCUMENTS

JP 2005226865 A * 8/2005

* cited by examiner

Primary Examiner — Gail Verbitsky
(74) Attorney, Agent, or Firm — Merek, Blackmon & Voorhees, LLC

(57) ABSTRACT

A surrogate temperature sensor (52) for a convection cooled radiant heater system is described. The surrogate temperature sensor has an internal controllable heater (62) and a sensing device such as a thermocouple (64). The surrogate temperature sensor is paired with a furnace/dryer radiant heat source (38). The surrogate's internal heater provides sufficient power to heat the surrogate to the same temperature as the radiant heater. At least one surrogate temperature sensor (52) is positioned to be exposed to the cooling media in a manner similar to the radiant heat source. The surrogate sensor reports its temperature which is indicative of the radiant heater temperature to the cooling controller. The controller responds to this signal and adjusts cooling to maintain the radiant heater at its desired temperature.

9 Claims, 6 Drawing Sheets

SURROGATE TEMPERATURE SENSOR FOR A RADIANT HEAT SOURCE

CROSS-REFERENCE TO RELATED APPLICATIONS

Provisional patent application 61/371,480 filed Aug. 6, 2010

STATEMENT REGARDING FEDERALLY SPONSORED RESEARCH OR DEVELOPMENT

There has been no federal funding for this project.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of Invention

This invention relates to a method of measuring and controlling radiant heater surface temperatures that would otherwise be very difficult or expensive to measure or control. It is particularly useful for heaters and furnaces such as UV or microwave dryers which use plasma bulbs as heat sources.

2. Description of Prior Art

UV furnaces are used for drying and curing adhesives, inks and other coatings. Most of these furnaces have radiant heat sources such as RF and microwave excited plasma bulbs. Efficient operation of the plasma bulbs require that material inside the bulb be in a gaseous and ionized state. Many of the desired materials condense at less than 357° C. so these bulbs have starter material necessary for ignition. After ignition and heating, the desirable materials vaporize and become active. Plasma bulbs emit UV radiation which is part of the electromagnetic spectrum and is limited by X radiation on the short side and infrared light on the longer wave area. The wave length of the light is determined by the chemistry of the excited gases. Heat from these radiant sources is across a wide spectrum: UV (100 to 380 nm), visible light and IR. The enclosure that surrounds the bulb can have selective coatings that determine the wave length of the reflected light, (US Patent 2005/0115498 A1)

The plasma bulbs will overheat and fail without proper cooling. Cooling air is forced by a fan or blower over the heat source. Radiant heat from the source is usually reflected and/or focused onto the material to be dried or cured. Sometimes shields are added to prevent convective heating of the material to be cured. (U.S. Pat. No. 6,831,419)

The body of the plasma bulb is usually made of quartz. Quartz has a very low coefficient of thermal expansion and thus is almost immune to thermal stress. It is nearly transparent to the IR and UV radiation so radiant heating is small. However the quartz tube is the weak link and it has been the focus of much innovation. U.S. Pat. No. 5,541,475 showed that varying the quartz wall thickness can compensate for uneven heating.

Practical use of these dryers can require intermittent operation. Such operations require a shutter system (as taught in U.S. Pat. No. 6,933,683). The shutter system seals the optical cavity and reduces heat loss when the bulb is operated at reduced power. Alternately, the bulb power can be reduced and abruptly restarted (U.S. Pat. No. 5,838,114). The time response of the cooling systems and quartz bulbs are not equal and uneven heating and cooling degrades the bulb.

Another technique in dryer operation is to temporarily overdrive the heater. Then the power is reduced before the bulb overheats. The intermittent high power allows a more efficient operation. (U.S. Pat. No. 6,690,112)

Bretmersky et al (US 2008/0017637) describe control systems for UV dryers. The inventors recognize that reliable operation requires that the heater element be actively cooled. The technique developed by them was to estimate cooling capacity of the air steam. It is well understood that convection heat transfer can be correlated to coolant velocity which can be correlated to system pressure drop. Then by using the estimated velocity, fluid properties, surface conditions and local conditions (velocity, boundary layer thickness, etc.), the heat transfer coefficient can be inferred. That calculated heat transfer coefficient and estimated temperature difference is then used to calculate the convection cooling capacity. Next the cooling requirements of the source are estimated based on that bulb's power density. And finally with this information, the cooling (air speed) is adjusted by the control system to provide the required cooling. Such a system is at best an estimate on indirect measurements.

An alternate embodiment as described by Bretmersky utilizes pressure and temperature measurements. A temperature sensor measures the coolant temperature but with some radiant heating from the heat source. Radiant heating of the sensor is a function of the fourth power of the radiant heat source temperature. It is inversely proportional to the square of the distance from the heater. Radiant heating of the temperature sensor is also affected by its absorptivity. This makes the temperature of questionable value in estimating the radiant heat source temperature. It is possible to design a system where the sensor reports the heater temperature correctly but that will be at only one condition. Changing the inlet air temperature, distance from heat source, absorptivity or heat source power will produce erroneous readings. The primary purpose of this system is to control the radiant heat source temperature but that temperature is not measured.

Surrogate temperature sensors have been used in other industries as taught by Potts (U.S. Pat. No. 6,726,401) in measuring the temperature of a leach field. He used the temperature of an adjacent field that was convenient to measure.

In the case of temperature measurements in a harsh environment, such as a diesel engine combustion chamber, Abe et al (U.S. Pat. No. 4,516,543), showed how a circuit could simulate the temperature of the object to be controlled. The simulated temperature was used as a surrogate temperature when controlling the diesel engine glow plug. This patent showed how to estimate and then control glow plug temperature with a simulated glow plug temperature.

BRIEF SUMMARY OF THE INVENTION

Accordingly, it is the object of the present invention to assemble an apparatus for effective radiant heater temperature control. The surrogate temperature sensor provides a signal that can be directly related to the heater temperature. The surrogate temperature sensor has the same thermal behavior as the heater. The system as described here is independent of cooling fluid temperature, coolant properties (air, dry nitrogen, helium) and flow reductions due to system limitations such as clogged filters. The surrogate temperature sensor reports the bulb temperature at different power levels. The surrogate's signal can be used as input to the cooling controller. The system will easily accept dryers with movable shutters and/or selective coating reflectors.

REFERENCE NUMERALS

Figure 1A:
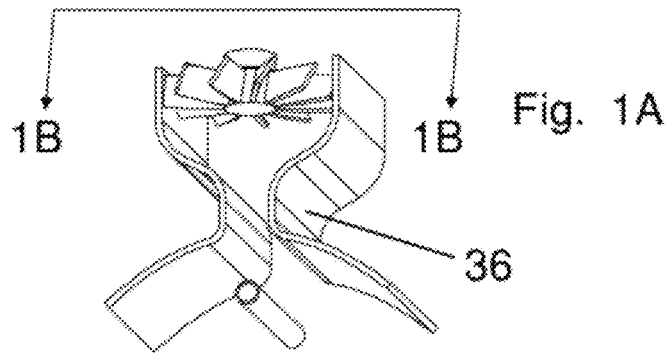
FIGS. 1A & B show an isometric and end view of a radiant heater/dryer system.

| | |
|---|---|
| 30 radiant heater system | 32 fan/coolant mover |
| 34 cooling media | 36 heater chamber |
| 38 quartz heater tube | 40 heat source |
| 42 radiant heater system with control | 44 temperature sensor |
| 46 differential pressure sensor | 48 electronic cooling control |
| 50 radiant heater system with a surrogate temperature sensor | 52 surrogate temperature sensor |
| 54 shield or second sensor | 56 Faraday enclosure mesh |
| 58 elements for thermal analysis | 60 surrogate temperature sensor quartz envelope |
| 62 surrogate's internal heater wire | 64 thermocouple |
| 66 thermocouple wires | 68 thermocouple sensing bead |
| 70 heater power | 72 convective heat loss |
| 74 radiant heat loss | |

DETAILED DESCRIPTION OF THE INVENTION

Convention

This description utilizes conventional terms (such as Q to indicate heat, and "H$_2$O to indicate pressure drop in inches of water column). The cooling media could be air, nitrogen, helium and any suitable cooling fluid. The cooling fan or blower is typical of any fluid mover. The control system is a traditional feedback system that adjusts the coolant flow to maintain a desired heater temperature. This invention will work well with any material suitable for furnace/dryer use. The radiant heat source could be a plasma bulb since that is a common industrial application of this patent. However this patent can apply to other radiant heat sources. If the heat source were a plasma bulb, it could be heated with electric current or irradiated with microwaves. Consequently, this description does not labor the reader with such details.

Thermal Review of Dryers/Furnaces

Conventional radiant dryers have forced air cooling of the heat source. These heat sources are usually encapsulated in a quartz bulb. The forced air generally overcools and reduces the radiant efficiency of the heat source. Reliability is degraded when the bulbs operate above 850° C. 750° C. is usually considered a reliable temperature. Most (about 82%) of the heat is radiated from the bulb; the remainder is convected from the bulb's surface. Radiation efficiency increases with bulb temperature. Hence there is a need to operate the bulb as hot as reliability allows.

A controlled furnace adjusts the cooling air flow to keep the plasma heat source at the desired temperature. Unfortunately, the quartz tubing can not be easily measured. Quartz is transparent to optical measurements. Some optical pyrometers can be tuned to measure quartz but they are too expensive to be installed on all heaters. Direct contact measurement would weaken the tube because the sensor would create a hot spot. Prior art control systems rely on the system pressure drops to determine the air flow. Such measurements are error prone due to changes in flow resistance (dirty air filters). When the cooling capacity is estimated by air temperature measurements, the errors are compounded. Schemes to determine the heat source temperature are at best indirect. Consequently the cooling of the bulb is not optimal.

DETAILED REVIEW OF DRAWINGS

Figure 1B:
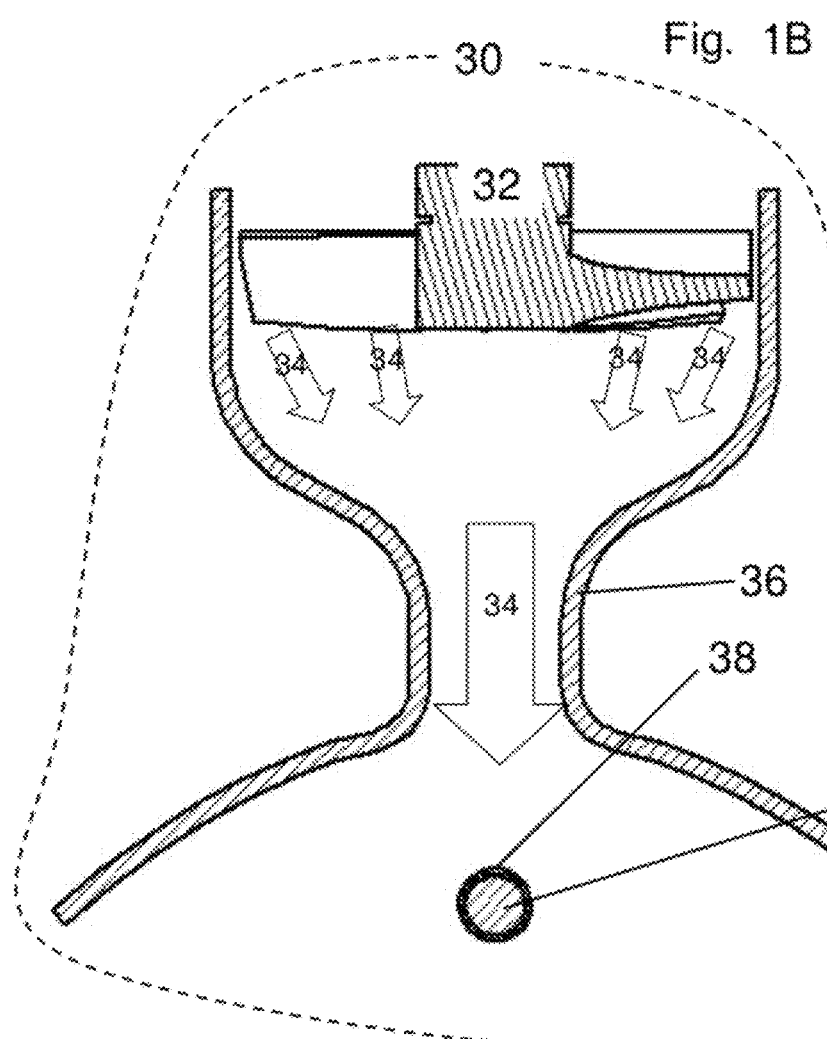

FIGS. 1A and 1B show a conventional radiant heater system (30). A fan (32) moves cooling air (34) to flow through a furnace enclosure (36). The furnace enclosure is illustrated as a shroud that gathers the cooling air and directs it against the radiant heater. The lower portion of the shroud is shown as a parabolic reflector to focus the radiant heat downward. Frequently the furnace shroud (optical cavity) focuses the light on the material that is being cured or dried. The shape of the shroud is not important to this invention. A quartz tube (38) surrounds a heat source (40). Commonly this heat source is an ionized gas which is electrically conductive. Radio frequency electric power or microwave energy excites this gas and heats it to thousands of degrees. Containment of this gas is accomplished with quartz tubing.

Figure 2A:
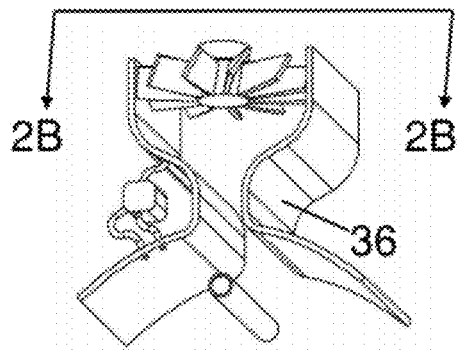
FIGS. 2A & B show an isometric and end view of a controlled radiant heater/dryer system.
Figure 2B:
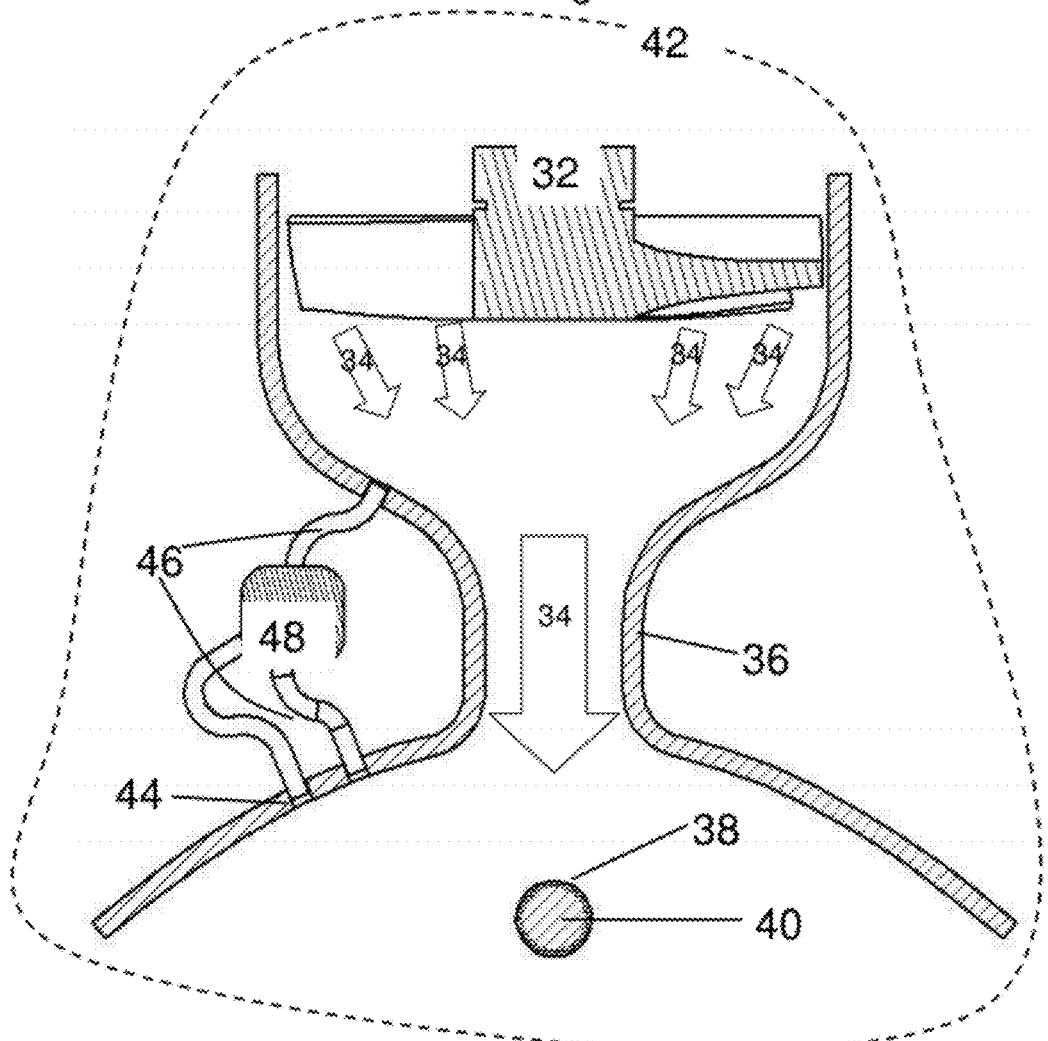

FIGS. 2A & 2B show a radiant heater system (42) which has cooling control. Cooling air (34) is moved by a fan (32) to flow through a furnace enclosure (36). The controller (48) calculates the required cooling capacity based on bulb power. Then the controller adjusts the fan speed to deliver that cooling capacity. The controller estimates the delivered cooling capacity based on temperature as measured by temperature sensor (44) and pressure drop as measured by differential pressure sensor (46). Until now, this approach had a fundamental weakness. The control system did not measure the temperature it is controlling. Sensor (44), which is located on and near the shroud and upstream of the heater, essentially measures the incoming air temperature. There is some radiant heating of the sensor but the sensor is essentially independent of heater temperature.

Improved Control System with Surrogate Temperature Sensor

Figure 3A:
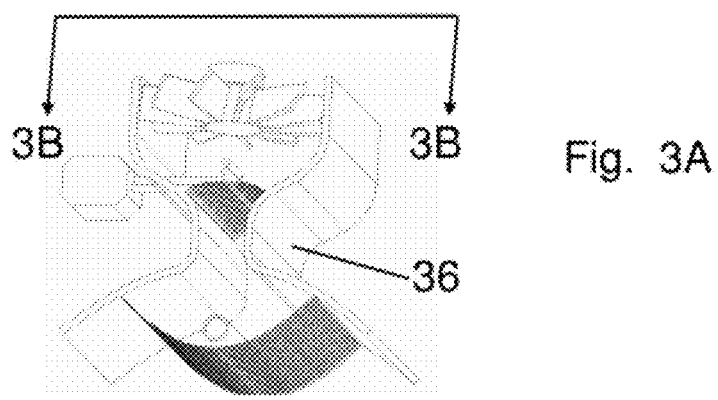
FIGS. 3A & B show an isometric and end view of a radiant heater/dryer system with a surrogate temperature sensor.
Figure 3B:
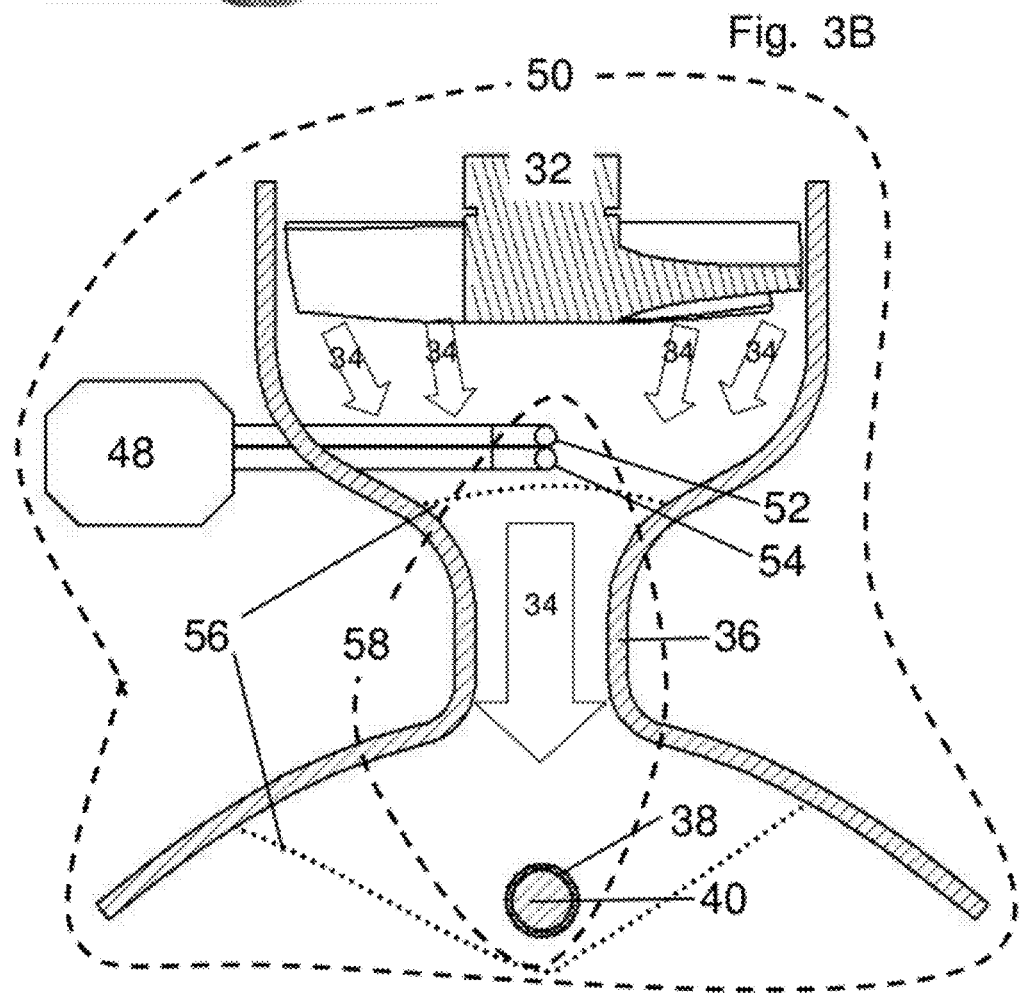

FIGS. 3A & 3B show a radiant heater system (50) equipped with a surrogate temperature sensor. A coolant mover (32) moves coolant (34) through enclosure (36) to cool the heater tube (38). The surrogate temperature sensor (52) is in the same cooling flow as the radiant heat source. A shield (54) prevents radiant heat from the heater impinging on the surrogate. If the radiant heater were of the microwave type, the surrogate must be outside the Faraday enclosure. The Faraday enclosure mesh (56) is illustrated as a dotted line upstream and downstream of the heater. Locating the surrogate temperature sensor outside the Faraday enclosure prevents microwave heating of the surrogate temperature sensor. The dashed line identifies elements for thermal analysis (58). A detailed description of these elements will be presented shortly.

Surrogate Temperature Sensor

The surrogate temperature sensor has two primary parts: a temperature sensor that provides a signal that is used by the cooling controller and a controllable internal electric heater. One embodiment uses a sheathed ungrounded Inconel thermocouple. Inconel is capable of sustained operation at elevated temperatures, (1150° C.). The controllable electric heater could be tungsten wire wrapped around the thermocouple. The thermocouple and wire might be encased in quartz and be approximately 3 mm in diameter. A third part but external to the sensor is a controller which provides power to the surrogate's internal heater.

Figure 4A:
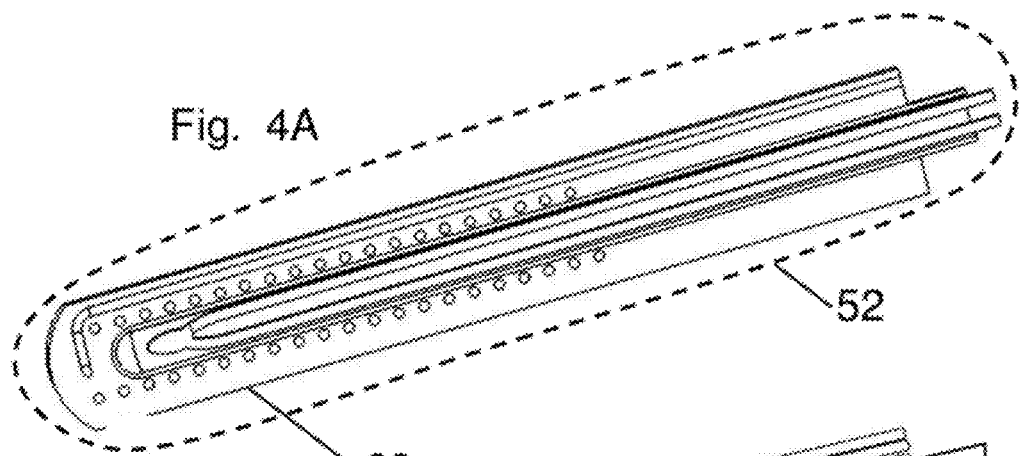
FIGS. 4A-C show details of the surrogate temperature sensor.
Figure 4B:
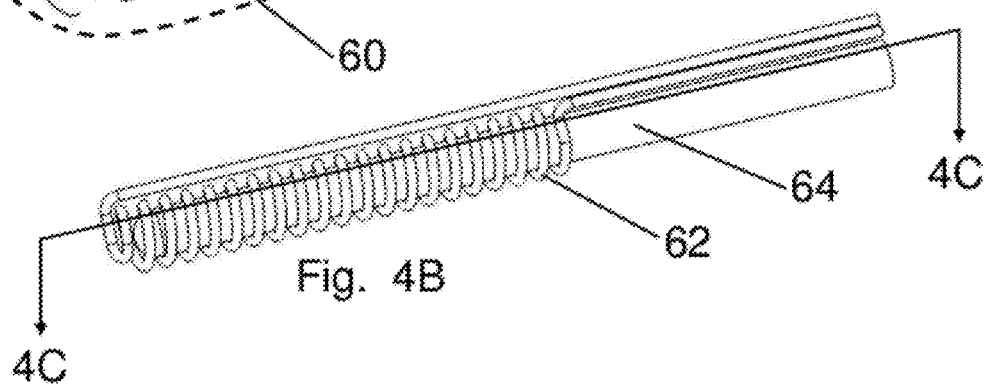
Figure 4C:
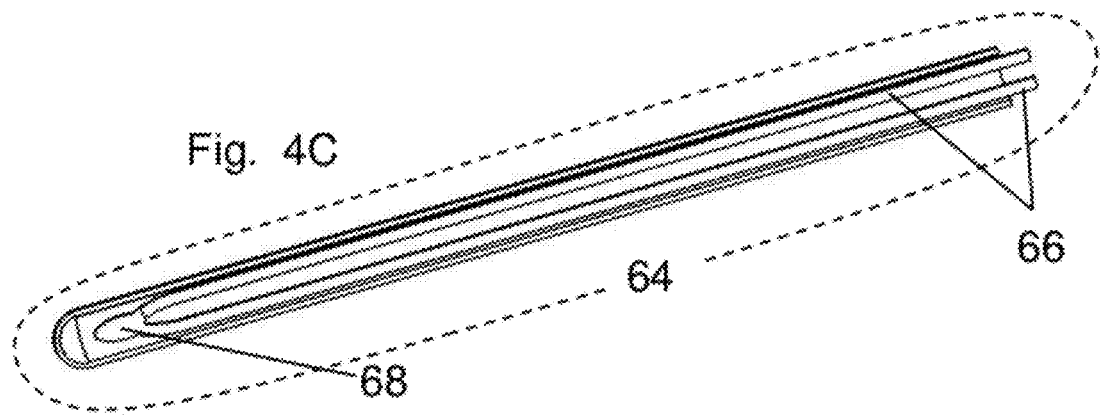

FIG. 4A shows a sectional view of a surrogate temperature sensor (52). The quartz envelope (60) is illustrated. FIG. 4B shows the heater wire (62) wrapped around the thermocouple (64). FIG. 4C shows a sectional view of the thermocouple (64) with its sense wires (66) and sensing bead (68). The tungsten heater wires need only heat the end near the sensing bead. Therefore the power to heat the sensor is small.

The surrogate temperature sensor must be at the same temperature as the radiant heater. An external controller does this by providing as much electric power to the surrogate's internal heater as the surrogate losses to convection. The surrogate is much smaller than the plasma heater so the power to the surrogate is small. Only the convection losses from the radiant heater need to be duplicated.

An optical pyrometer is used in the programming, or calibration, of the external controller. The programming, or calibration, provides the data points necessary to control the plasma bulb temperature over its entire operating range. Each data point consists of two measurements: the plasma bulb power and the surrogate internal heater power. For a given plasma bulb power, the air flow is adjusted to produce the desired bulb temperature. That temperature is measured directly by the optical pyrometer. The surrogate temperature sensor is located in the same furnace and exposed to the same air flow. Then the power to the surrogate is adjusted to read that same temperature as the plasma bulb. At that time, the convective heat fluxes from both are equal. Both are at the same temperature and exposed to the same air flow. The plasma power and surrogate internal heater power is recorded. The programming, or calibration, is completed by repeating these measurements over the power range of the bulb. These measurements characterize the plasma bulb and allow the surrogate to mimic its thermal behavior. Now the external surrogate controller only needs the bulb power level as input. The output of the external controller is the power needed by the surrogate temperature sensor to mimic the plasma bulb. If the cooling fans are running too slow, the surrogate (and the plasma bulb) will be hotter than desired. The high temperature would signal the controller to increase the cooling flow until the optimum temperature is reached.

The surrogate and plasma bulb have the same convective heat flux. Convective heat flux from the bulb will change with bulb diameter. Therefore the programming of the controller must be repeated for bulbs of different bulb diameters.

Another embodiment would have more than one thermocouple for redundancy.

Yet another embodiment would equip the shield with a thermocouple. The shield is radiantly heated by the plasma heater and its temperature may be useful to the control system. The elevated shield temperature would indicate that the plasma bulb is functioning. This is typical of patent class 374/133 (dummy sensor). The shield may also provide structural support for the surrogate.

Detailed Thermal Review of a Typical System

Figure 5:
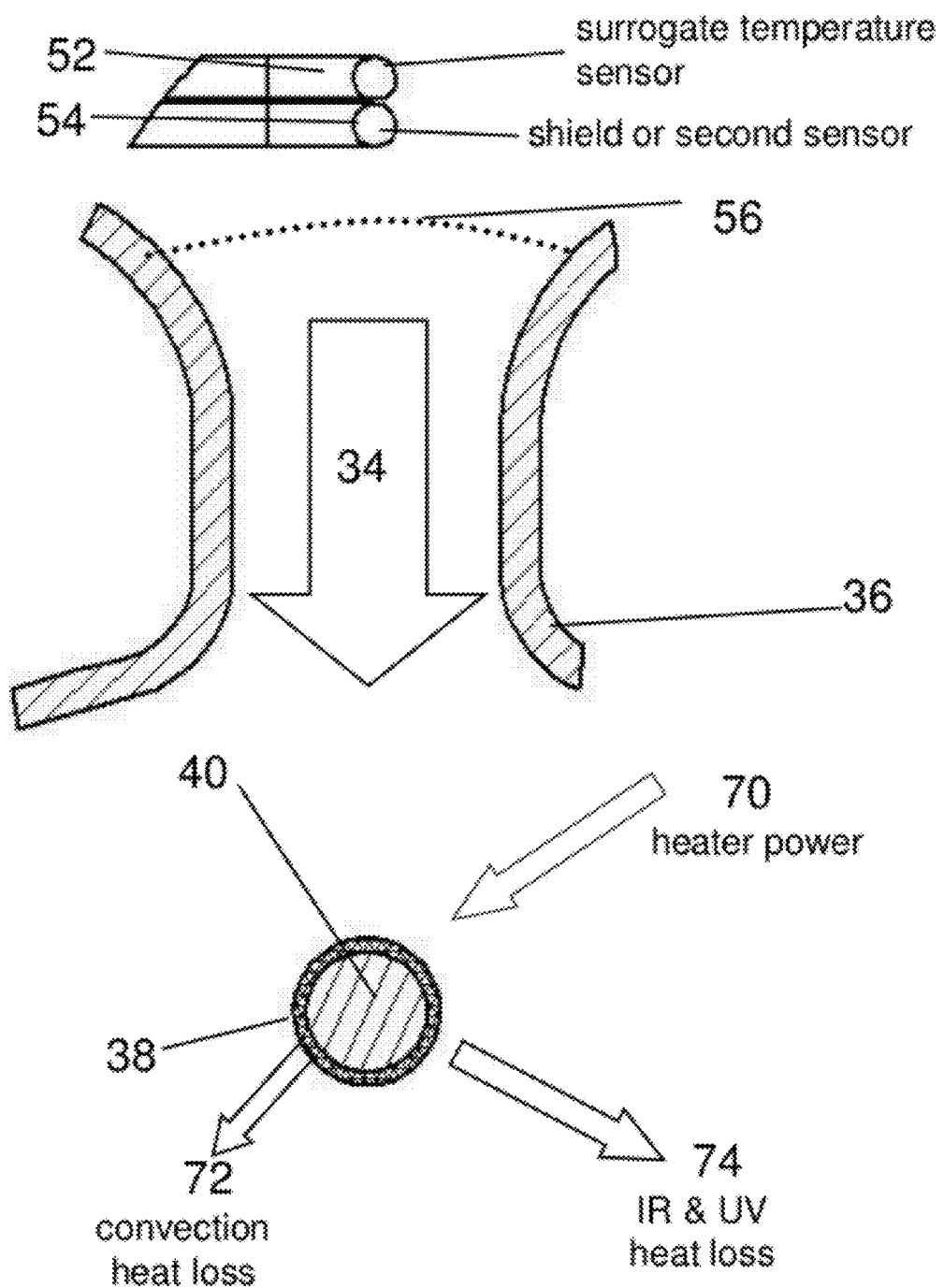
FIG. 5 shows thermal analysis details.

It is the purpose here to explain how the surrogate temperature sensor is an improvement of the art. The portion of FIG. 3B enclosed by the dashed line (58) is analyzed. This analysis is shown in FIG. 5. This does not reduce the applicability of this invention but details an example of practical use.

FIG. 5 illustrates a quartz heater tube (38) enclosing a heat source (40). The heater power (70) is usually measured in watts/inch. In steady state, all of this heat is removed from the heater by convection (72) and radiation (74). Consider the following case: 11 mm outer diameter heater and 450 watts/inch. For such conditions, the average plasma temperature will be approximately 5493° C. At steady state, all 450 watts/inch is radiated and convected from the heater. Measurements of such lamps show that 18% of the heat is convected from the quartz surface. The remainder, 82%, is radiated from the plasma. A 30° C. air flow of 5000 feet/minute is sufficient to convect this heat away. The resulting quartz outer surface temperature is a reliable 750° C. The surrogate temperature sensor (52) is located upstream and outside the Faraday enclosure. It is not exposed to radiant heat and its internal heater is its only heat source. 15 watts of internal heat is sufficient to heat a 12 mm length of the 3 mm outer diameter sensor. A well-designed sensor will have the same dynamic thermal response as the quartz heater. The shield (54) can be a supporting structure or an additional sensor (dummy sensor as discussed earlier). In this example, 15 watts of surrogate heat produces a temperature equal to the radiant heater tube at 450 watts/inch. Changes in cooling air flow or temperature will have an equal effect on both radiant heater and sensor.

It is common practice to operate these furnaces in a low power mode (simmer). The bulb is hot and the ionized gases are ready for full power. The necessary cooling air flow is also reduced. Consider the case where the radiant heater power is reduced to 45 watts/inch; now the average plasma temperature is 2969° C. The necessary coolant velocity is reduced to 945 feet/min. The surrogate temperature sensor's internal heater power is now 4.0 watts. As before, the surrogate and radiant heater are at the same temperature. However the fraction of heat convected from the quartz heater surface increases to 47%. The convected portion increases because the convective heat transfer is roughly proportional to temperature difference. Radiant heat transfer is proportional to the temperature difference to the fourth power. Consequently the radiate heat transfer is strongly affected by changes in temperature.

Figure 6:
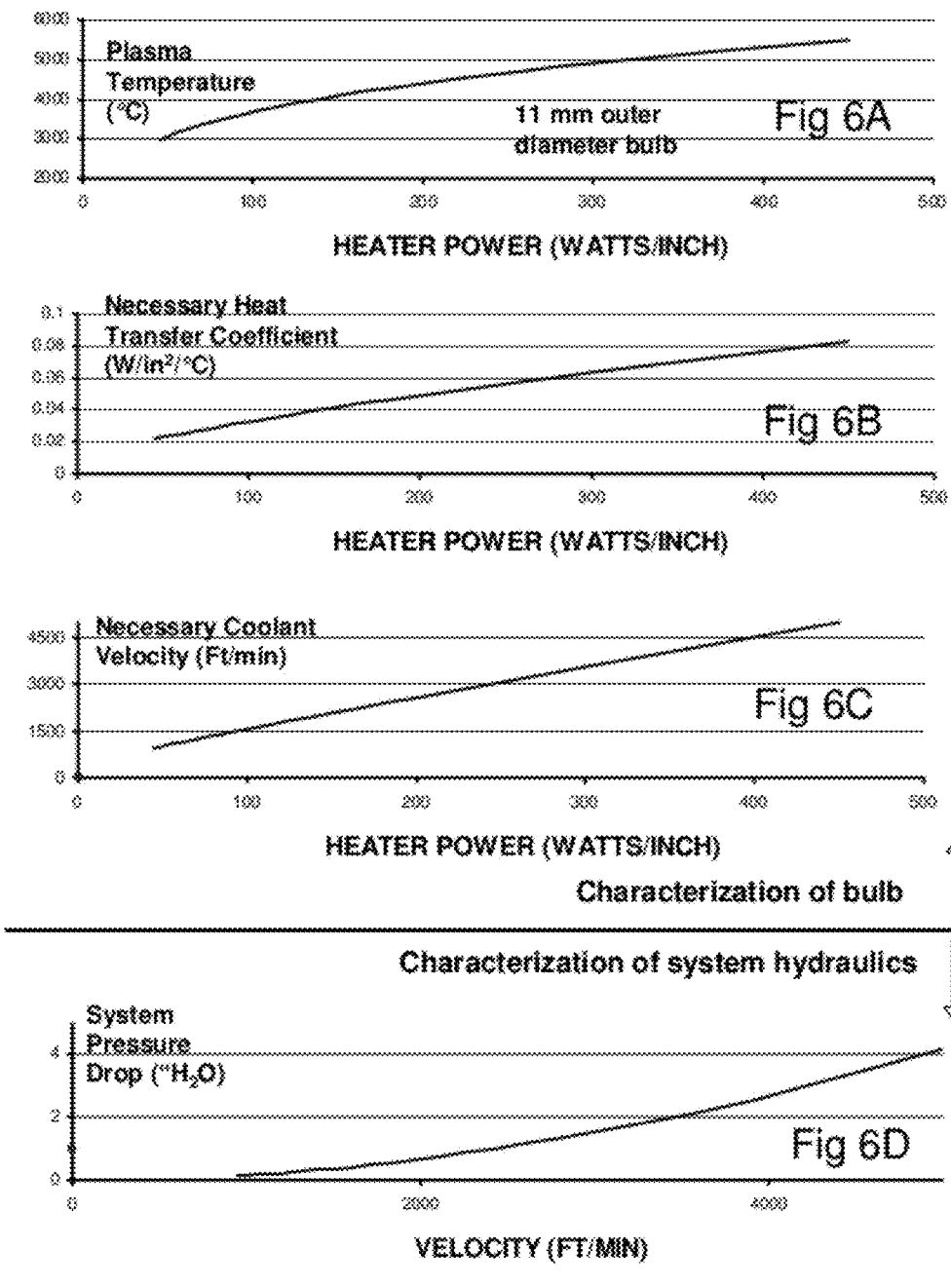
FIGS. 6A-D show the steps in prior art to design a radiant heater control system.

FIGS. 6A-D show the steps in prior art to design a radiant heater cooling control system. Consider the full power conditions as described in FIG. 5. First the designer would determine the thermal characteristics of the plasma bulb. FIG. 6A shows plasma temperature as a function of heater power. Next the designer would calculate the convective heat coefficient that is necessary to maintain a constant heater surface temperature. This is a complex calculation since the convective heat transfer changes over the bulb's power range. If we assume that the desired quartz temperature is 750° C. and the air temperature is a steady 30° C., there is a 720° C. temperature difference. So for a specific bulb size and air temperature, he must calculate the required heat loss. Then with the convective heat loss, the temperature difference and the surface area, the designer can calculate the necessary heat transfer coefficient; for this case, it is shown in FIG. 6B. Then the third step is done by one skilled in heat transfer correlations where the necessary heat transfer coefficient as shown in FIG. 6B is related to coolant velocity. That velocity is calculated and shown in FIG. 6C. These three steps and graphs characterize the bulb.

The next step is to determine the thermal hydraulic characteristics of the furnace. Calculations are useful but for any precision, measurements are necessary. This is done by simultaneously measuring the system pressure drop and air flow rate. Then the air flow rate is converted to air velocity on the bulb. Measurements would produce a curve similar that shown in FIG. 6D. Even so, changes in operating conditions will affect the results.

Now with these calculations and measurements, one can program the heater control system. The controller would accept as input the heater power and then calculate the necessary coolant velocity. Then the control system adjusts the fan to create the pressure drop that corresponds to the velocity that corresponds to the necessary bulb cooling at that power level. Changes in inlet air temperature, system hydraulics (dirty air filters, changes in shutters) will introduce errors. The prior art as shown in FIGS. 6A-D is error prone because it is based on successive calculations and errors are compounded.

The surrogate temperature sensor simplifies this process because it reports a temperature equal to the quartz bulb. The surrogate temperature sensor makes the system more robust because changes in inlet temperature, cogged air filters, changes in shutter position or other hydraulic features do not introduce errors. The design of the surrogate is straight forward; the convective heat flux from the quartz bulb and surrogate are equal. The surrogate internal heater power is calibrated for a particular bulb size and power. The design is verified by measuring the quartz temperature with an optical pyrometer. The surrogate is positioned in the furnace to experience the same coolant flow as the quartz bulb and to be shielded from radiant heat.

For assuring that a temperature of the radiant heater does not exceed a predetermined temperature, apparatus (50) can be adapted so that member (52) senses a temperature equal to heater (38) and controller (48) responsively to that sensed temperature initiates the necessary cooling action.

What is claimed:

1. An apparatus for measuring the surface temperature of a radiant heater cooled by a convection cooling fluid, the radiant heater having a convective heat flux comprising:
    at least one temperature sensing device; and
    a controllable heater thermally connected to said sensing device, the controllable heater having a convective heat flux, wherein both the sensing device and the controllable heater are encapsulated in an envelope, wherein said controllable heater is the sole heat source of the envelope, wherein said envelope is exposed to said convection cooling fluid, wherein the controllable heater is powered by an external device which is calibrated to heat the sensing device to the same temperature as the radiant heater to be measured, and wherein said sensing device reports a signal indicative of the temperature of said radiant heater.

2. An apparatus according to claim 1, wherein the thermal response of the sensing device is similar to the thermal response of the radiant heater to be monitored, thereby enabling the signal from the sensing device to provide the instantaneous temperature of the radiant heater.

3. An apparatus according to claim 1, wherein the cooling fluid is not air.

4. An apparatus according to claim 1, wherein the convective heat flux from said controllable heater and the convective heat flux from the radiant heater are equal.

5. An apparatus according to claim 1, further comprising a dummy shield sensor exposed to radiant heat from the radiant heater to be measured to indicate a failed radiant heater, the dummy shield sensor being positioned to prevent radiant heat from the radiant heater impinging on said controllable heater.

6. An apparatus according to claim 1, further comprising a controller to maintain the radiant heater at a predefined temperature.

7. An apparatus according to claim 4, wherein the power provided by the external device to the controllable heater is determined by calibration measurements and by the convective heat flux from said controllable heater and the convective heat flux from the radiant heater being equal.

8. An apparatus according to claim 1, further comprising a shield preventing radiant heat from the radiant heater impinging on said sensing device, the shield being positioned to prevent radiant heat from the radiant heater impinging on said controllable heater.

9. An apparatus according to claim 8, wherein the shield comprises a temperature sensor exposed to radiant heat from the radiant heater in order to indicate failure of the radiant heater.

\* \* \* \* \*